W. L. BURNAM.
LOCKING DEVICE FOR DIFFERENTIAL GEARINGS.
APPLICATION FILED AUG. 10, 1909.
964,387.
Patented July 12, 1910.
2 SHEETS—SHEET 1.
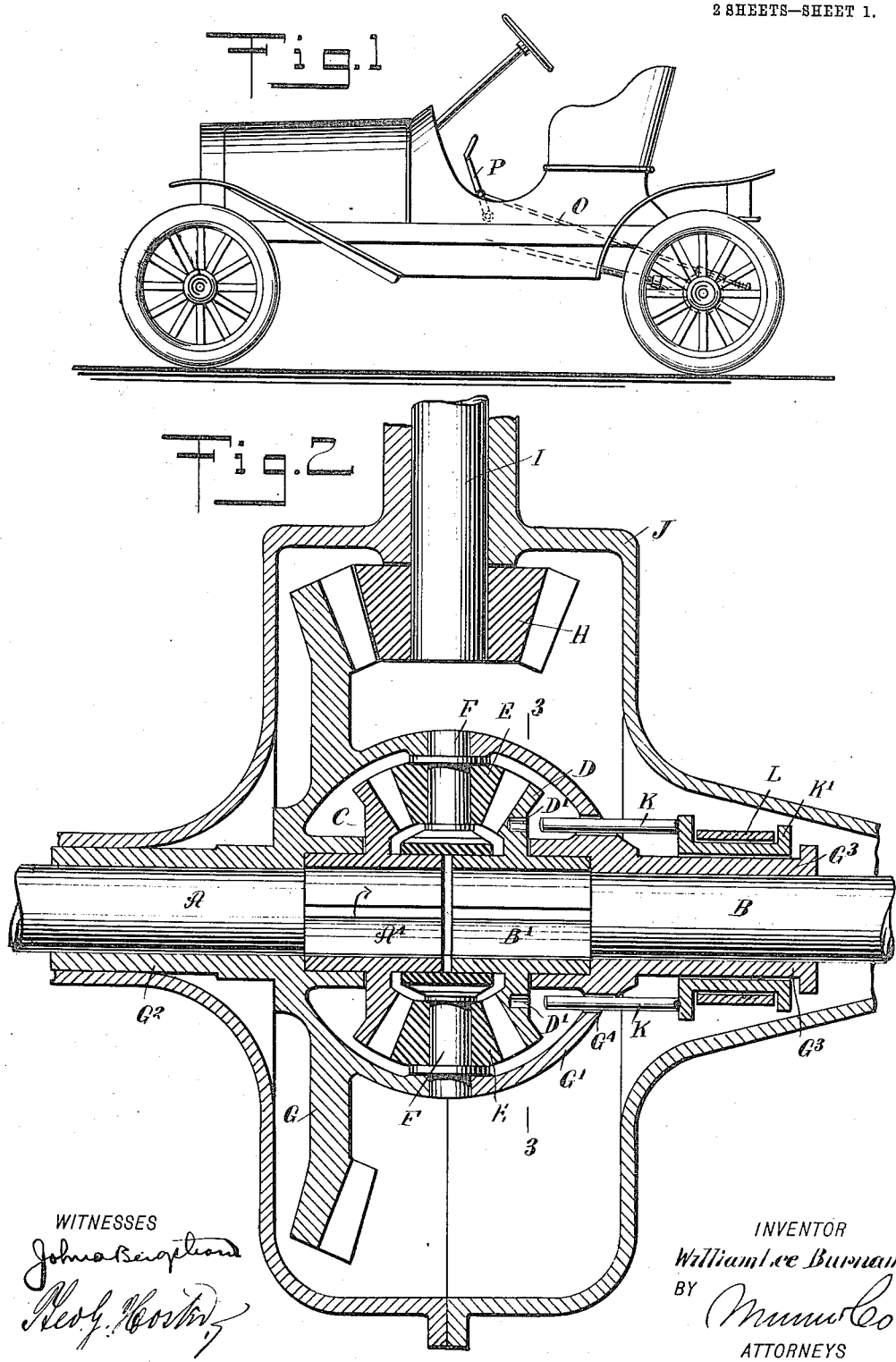
WITNESSES
INVENTOR
William Lee Burnam
BY
ATTORNEYS

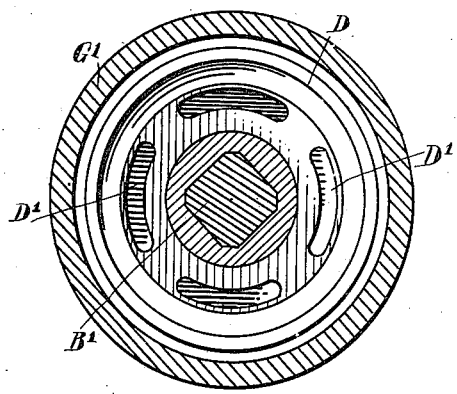
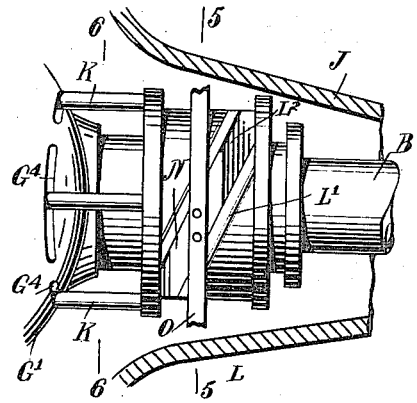
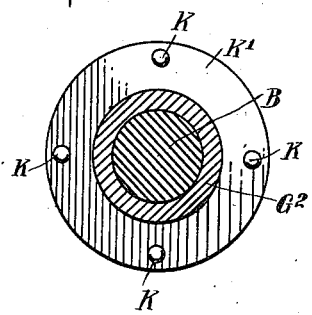
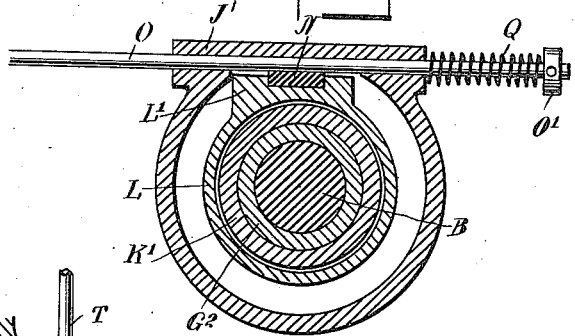
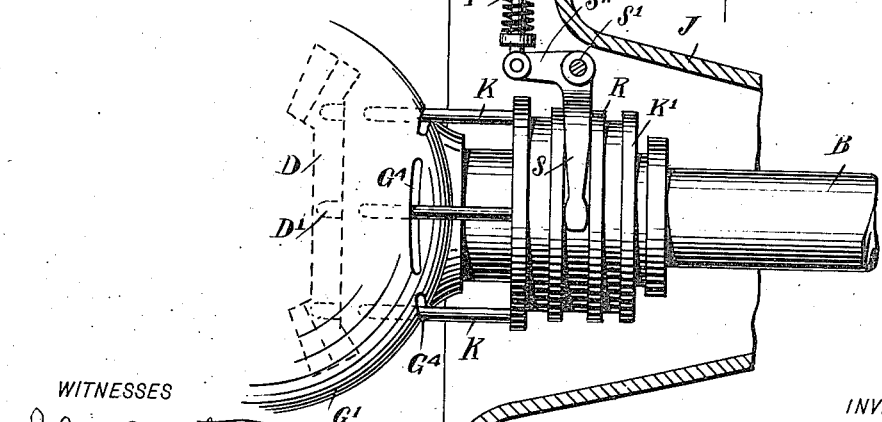

UNITED STATES PATENT OFFICE.

WILLIAM LEE BURNAM, OF KANSAS CITY, MISSOURI.

LOCKING DEVICE FOR DIFFERENTIAL GEARINGS.

964,387.

Specification of Letters Patent.　Patented July 12, 1910.

Application filed August 10, 1909. Serial No. 512,168.

*To all whom it may concern:*

Be it known that I, WILLIAM LEE BURNAM, a citizen of the United States, and a resident of Kansas City, in the county of Jackson and State of Missouri, have invented a new and Improved Locking Device for Differential Gearings, of which the following is a full, clear, and exact description.

The invention relates to the driving gear for the sectional axle of an automobile or like vehicle, and its object is to provide a new and improved locking device for differential gearing, to neutralize the differential action of the gearing whenever it is desired to drive the axle sections in unison, to prevent one axle section from spinning around loosely, while the other meets an obstruction and retards its turning.

For the purpose mentioned, a locking device is provided for engagement with the differential gearing to neutralize the differential action of the same and to rotate the axle sections in unison.

A practical embodiment of the invention is represented in the accompanying drawings forming a part of this specification, in which similar characters of reference indicate corresponding parts in all the views.

Figure 1 is a side elevation of an automobile provided with the improvement; Fig. 2 is an enlarged sectional plan view of the improvement as applied to the differential gearing; Fig. 3 is a sectional side elevation of the same on the line 3—3 of Fig. 2; Fig. 4 is a plan view of the same and showing more particularly the shifting mechanism; Fig. 5 is a sectional side elevation of the same on the line 5—5 of Fig. 4; Fig. 6 is a similar view of the same on the line 6—6 of Fig. 4; and Fig. 7 is a plan view of a modified form of the shifting mechanism as applied.

The axle sections A and B of the rear or driving axle of an automobile or a like vehicle are provided with adjacent polygonal ends $A'$, $B'$, on which are secured the bevel gear wheels C and D, in mesh with one or more pinions E, journaled on a stud or studs F, carried by the casing-like hub $G'$ of a drive wheel G, preferably in the form of a bevel gear wheel, in mesh with a pinion H, secured on the driving shaft I driven by the motor of the automobile or other machine. The extensions $G^2$ and $G^3$ of the hub $G'$ are journaled on the axles A and B, as plainly indicated in Fig. 2, and the shaft I has one end journaled in the casing J inclosing the differential gearing in the usual manner.

The parts, so far described, are practically the same as found in differential gearings now used, it being understood that when the shaft I is rotated, a rotary motion is transmitted by the pinion H to the wheel G, which by the pinions E rotates the bevel gear wheels C and D, to rotate the axle sections A and B and consequently turn the wheels held on the said axle sections. Now, in case one of the wheels strikes an obstruction or is otherwise retarded from turning, then the other wheel turns so much faster for the time being owing to the differential gearing employed. Now when it is desired to neutralize the differential action, use is made of a locking device which locks the wheel G to one of the bevel gear wheels C or D, as shown in the drawings, locking the wheel G and the bevel gear wheel D together. To accomplish the result, locking pins K are provided, projecting from one end of a sleeve $K'$, mounted to slide on the hub extension $G^3$, the said locking pins extending through slots $G^4$ formed in the hub $G'$, to engage similar slots or recesses $D'$ formed in the rear face of the bevel gear wheel D. Normally, the locking pins K are in the unlocking position shown in Fig. 2, and when it is desired to lock the bevel gear wheel D and the wheel G together, then the sleeve $K'$ is shifted from the right to the left, to engage the locking pins K with the slots or recesses $D'$, to cause the wheel G and the bevel gear wheel D to rotate in unison, and in doing so the axle sections A and B are caused to rotate in unison no matter whether one of the vehicle wheels is retarded or not. Thus the differential action of the differential gear wheel is neutralized.

The shifting mechanism for the sleeve $K'$ may be of various constructions, for instance, as shown in Figs. 4 and 5, the sleeve is provided with a loose shifting collar L, provided on top with an offset $L'$, having a diagonal guideway $L^2$ for the block N to slide in, the said block being attached to a shifting rod O, pivotally connected with a pedal P, under the control of the driver of the automobile, as will be readily understood by reference to Fig. 1. Normally, the rod O is held in a rearmost position by a spring Q, coiled on the said rod O, and resting with one end on the casing J, the other end of the spring abutting against a collar O' secured to the rod O. The rod O is mounted to slide in a suitable bearing J' on the casing J, as plainly indicated in Fig. 4.

The shifting mechanism shown in Fig. 7 consists essentially of a shifting collar R engaged by a shifting fork S, fulcrumed at S' in the casing J, and having an angular arm $S^2$ connected with one end of a rod T, connected with the pedal P, and pressed on by a spring T', to normally hold the locking device in inactive position. Now when the operator presses the pedal P, the sleeve K' is moved from the right to the left, to move the locking pins K in engagement with the gear wheel D, to lock the wheels G and D together for the purpose previously mentioned. When the operator releases the pressure on the pedal P, the spring Q or T' returns the locking device to normal inactive position.

Having thus described my invention, I claim as new and desire to secure by Letters Patent:

1. Driving gearing for an automobile or the like, comprising a driven wheel having a casing like hub provided with extensions, axle sections on which the hub extensions are journaled, bevel gear wheels secured on the axle sections within the casing like hub, an intermediate bevel pinion carried by the said hub and in mesh on opposite sides with the said bevel gear wheels, and a sleeve mounted to slide on one of the hub extensions, and having locking means for engagement with the hub of the driven wheel and one of said bevel gear wheels.

2. Driving gearing for a sectional axle of an automobile or the like, comprising a driven wheel, axle sections, bevel gear wheels secured on the axle sections, an intermediate bevel pinion journaled on the said driven wheel and in mesh on opposite sides with the said bevel gear wheels, a sleeve mounted to slide on the hub of the said driven wheel and having locking pins engaging the said driven wheel and adapted to engage one of the said bevel gear wheels to lock the latter and the driven wheel together, and a manually-controlled shifting device for moving the said sleeve lengthwise on the said hub.

3. The combination with the sectional axle of an automobile or the like, of a driven wheel having a casing like hub provided with extensions journaled on the respective axle sections, bevel gear wheels secured on the adjacent ends of the axle sections, an intermediate bevel pinion journaled on a stud carried by the hub of the driven wheel, the said pinion being in mesh on opposite sides with the said bevel gear wheels, a sleeve mounted to slide on one of the hub extensions, and having locking means for engagement with the hub of the driven wheel and one of the said bevel gear wheels, and means under the control of the operator for shifting the said sleeve.

4. The combination with the sectional axle of an automobile or the like, of a driven wheel having a casing like hub provided with extensions journaled on the axle sections, bevel gear wheels on the axle sections within the casing like hub, an intermediate bevel pinion carried by the said hub and in mesh with the said bevel gear wheels, the casing like hub being provided with slots and one of said bevel gear wheels having recesses formed therein, and a sleeve mounted to slide on one of the extensions of the hub of the driven wheel and having locking pins extending through said slots in the hub of the driven wheel and adapted to engage the recesses in the said bevel gear wheel.

5. The combination with the sectional axle of a vehicle, and a differential gearing for driving the axle sections, of a locking device having locking pins for engagement with members of the differential gearing to neutralize the differential action of said gearing, a shifting rod under control of the operator, connections between the said rod and the locking device to move the latter and the locking pins to locking position, and a spring coiled on the said rod and pressing on the same to normally hold the locking device in inactive position.

6. The combination with the sectional axle of an automobile or like vehicle, of a driven gear wheel having hub extensions journaled on the respective axle sections, a driving shaft, a pinion thereon in mesh with said gear wheel to drive the same, bevel gear wheels secured on the adjacent ends of the axle sections, intermediate bevel pinions journaled on said driven gear wheel, the said pinions being in mesh with the bevel gear wheels, and a sleeve mounted to slide on one of the hub extensions of the driven gear wheel and having locking means for engagement with the driven gear wheel and one of said bevel gear wheels.

7. The combination with the sectional axle of an automobile or the like vehicle, and a differential gearing for driving the axle sections, of a sleeve mounted to slide and having locking means for engagement with members of the differential gearing, and shifting means for shifting the said sleeve, the said shifting means comprising a pedal under the control of the operator, a shifting rod connected with the pedal, connections between the said rod and the sleeve to move the latter to active position, and a spring pressing on said rod and normally holding the sleeve and said locking means in inactive position.

In testimony whereof I have signed my name to this specification in the presence of two subscribing witnesses.

WILLIAM LEE BURNAM.

Witnesses:
CHAS L. MERRY,
C. N. SHELDEN.